March 25, 1969  G. VANDENBUSSCHE  3,434,334
SONIC ANALYZER
Filed Dec. 13, 1966
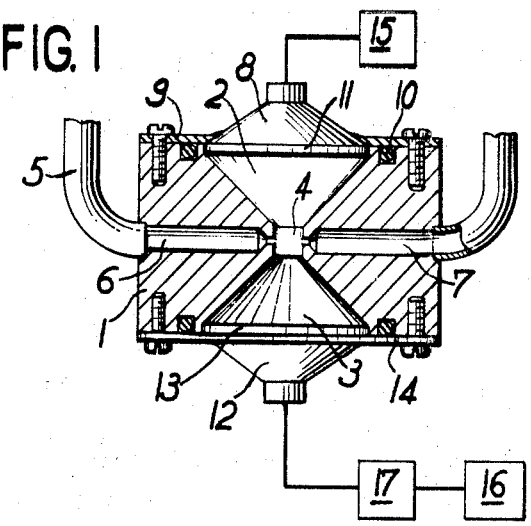
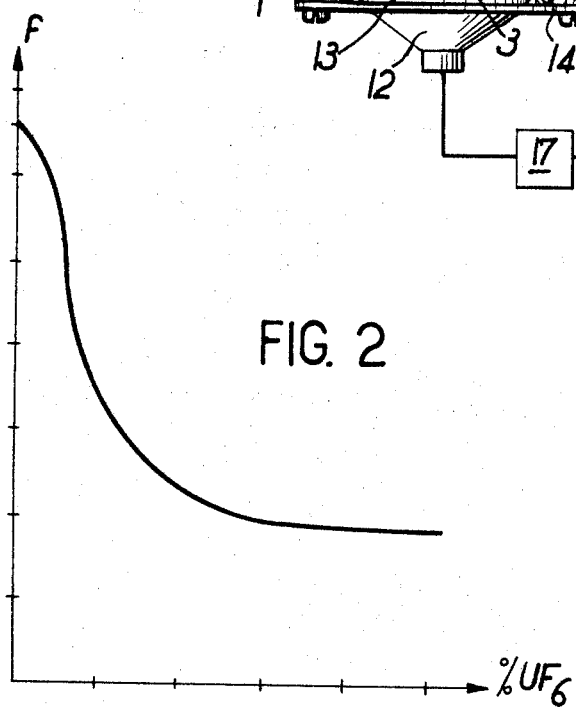
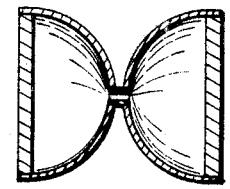

United States Patent Office 3,434,334
Patented Mar. 25, 1969

3,434,334
SONIC ANALYZER
Gerard Vandenbussche, Bobigny, France, assignor to Commissariat à l'Energie Atomique, Paris, France
Filed Dec. 13, 1966, Ser. No. 601,367
Claims priority, application France, Dec. 28, 1965, 44,062
Int. Cl. G01n 29/00
U.S. Cl. 73—24    3 Claims

ABSTRACT OF THE DISCLOSURE

A sonic analyzer has two chambers interconnected by a passageway with means for introducing therein a gas to be analyzed. A variable frequency wave emitter acoustically communicates with one of the cavities and an electro-acoustic receiver is acoustically associated with the other cavity. The cavities and passageway are symmetrical with each other and have a symmetry of revolution with respect to the axis of the passageway.

This invention relates to a sonic analyzer which is designed for the determination of the velocity of sound in a gas or consequently for the determination of variations in concentration of a constituent in a gaseous mixture.

It is known that a resonance cavity has a range of natural frequencies, each frequency being proportional to the velocity of sound in the gas with which the cavity is filled, the coefficient of proportionality being such as to vary from one frequency to another. In point of act, the velocity of sound varies as a function of the characteristics of the gas (ratio of specific heat values at constant pressure and volume and molecular mass in particular). The determination of a resonance frequency therefore makes it possible after calibration to determine the relative proportions of two gases having different characteristics. The cavity under consideration thus constitutes a sonic analyzer.

In order to permit of easy and reliable operation of a sonic analyzer as hereinabove defined, it is necessary to ensure that the resonating cavity has only one resonance frequency which nevertheless varies according to the composition of the gas over the range of velocities of sound which are encountered when this composition varies. In fact, the natural frequencies of a resonating cavity which do not form an harmonic series are essentially dependent on the shape and dimensions of the cavity.

A one-to-one correspondence between the measured resonance frequency and the velocity of sound within the cavity (or the composition of the gas contained therein) must therefore be obtained by virtue of a particular constructional design of the resonance cavity which makes it possible to eliminate all except one of the natural frequencies of said cavity within the range of sonic velocities contemplated, or at least to reduce their intensity to a considerable extent.

With this object in mind, it has been proposed to make use of a sonic analyzer comprising two cylindrical cavities which are symmetrical with respect to a communication passageway and which are limited respectively by a variable-frequency electro-acoustic emitter and by a device for detecting waves which are propagated within the cavities. An anlyzer of this type is provided with means for filling the cavities with a gas to be analyzed or preferably with means for producing a continuous circulation of gas, said means being disposed in the vicinity of said common passageway.

However, it has been observed that sonic analyzers which are constructed as described above do not actually behave as true resonance cavities, but are rather similar in operation to sound pipes, a harmonic series being in fact observed in respect of each resonance frequency. Inasmuch as the harmonic frequencies are much closer together than the natural frequencies of different orders of the resonance cavity, their existence disturbs the operation of the cavity. In addition, the intensity of such frequencies can prove sufficient to hinder the determination of the fundamental resonance frequency. Thus, the interferences between the resonance frequency and the harmonics are liable to affect the results of measurements and to impair their accuracy. The possibility of confusion which thus arises nullifies the one-to-one correspondence between resonance frequency and velocity of sound, or composition of gas.

The present invention is directed to the design concept of a sonic analyzer which makes it possible to overcome the disadvantages referred-to above while retaining the advantages of analyzers of the prior art.

Accordingly, the invention proposes a sonic analyzer which is essentially characterized in that it comprises two cavities interconnected by a communication passageway and provided with means for introducing a gas to be analyzed, a variable-frequency wave emitter in acoustic communication with a first of said cavities, and an electro-acoustic receiver in acoustic communication with the second of said cavities, said cavities being symmetrical with respect to said passageway and the cross-sectional area of each cavity being of progressively increasing magnitude from said passageway up to said emitter and said receiver respectively, and the complete assembly of passageway and cavities having a symmetry of revolution with respect to the axis of said passageway.

In a preferred embodiment of the sonic analyzer according to the invention, said analyzer comprises means for circulating gas continuously through said cavities, said means advantageously comprising an inlet and an outlet located in the vicinity of the communication opening. This embodiment is particularly well suited for continuously checking the quality of a gas.

One particular form of construction of a sonic analyzer in accordance with the invention is described hereinafter by way of example and without any implied limitation of the invention, reference being made to FIGS. 1 to 3 of the accompanying drawings, in which:

FIG. 1 is a sectional view of the sonic analyzer in accordance with the invention;

FIG. 2 represents the calibration curve which is obtained by means of said analyzer;

FIG. 3 shows an alternative form of construction.

The sonic analyzer which is illustrated in FIG. 1 is made up of a body 1 delimiting two identical cavities of conical shape which form the resonators 2 and 3, and the summits or apices of which are disposed in opposite relation. A short cylindrical passageway 4 is pierced at the summits of said cavities in order to provide a communication between these latter. In the particular case considered, the angle at the vortex of each cone is 90 degrees. The complete assembly is endowed with symmetry of revolution.

Two ducts 6 and 7 are provided in the central portion of the body 1 and open laterally in the cylindrical passageway 4 at two diametrically opposite points. Said ducts can be joined to a pipe 5 for circulating a gas to be analyzed.

The large base of the conical resonator 2 which is constituted by a right section is fitted with an electro-acoustic emitter 8 which is rigidly fixed to a clamping plate 9, said plate being secured to the body 1 by means of bolts. An annular seal 10 is fitted in a circular groove of the body 1. The vibratory emitting diaphragm 11 occupies the base cross-section of the conical cavity 2.

The cavity 3 is fitted in a symmetrical manner with a microphone 12, the receiving diaphragm 13 of which occupies the terminal cross-section of the cavity 3. The microphone is rigidly fixed to a clamping plate 14 which is in turn secured to the body 1 by means of bolts.

The length and cross-sectional area of the cylindrical passageway 4 are small with respect to the dimensions of the conical cavities 2 and 3.

The electro-acoustic emitter 8 is energized by means of a variable-frequency oscillator 15. In addition, the microphone 12 which is responsive to the vibrations of the gas which are propagated from the emitter 8 is connected to an indicating apparatus 16 by way of an amplifier 17.

The operation of the sonic analyzer, which is already apparent from the foregoing description, will now be explained in the particular case of its application to the analysis of uranium hexafluoride and hydrogen fluoride. The sonic analyzer is first of all calibrated by circulating through the ducts 6 and 7 and the resonators 2 and 3 a mixture of uranium hexafluoride and hydrogen fluoride in predetermined and variable proportions.

A measurement is taken in the case of each known composition, the resonator 2 being accordingly energized by the electro-acoustic emitter 8. The frequency of this latter is varied until the indicator unit 16 shows a maximum amplitude of vibrations of the microphone 12. The corresponding frequency is the resonance frequency of the cavities.

The calibration curve obtained is similar to that of FIG. 2 which represents the resonnace frequency measured as a function of the percentage of uranium hexafluoride plotted as abscissae.

The analyzer which is thus calibrated is then connected to the pipe 5 through which is circulated a mixture of uranium hexafluoride and hydrogen fluoride in unknown proportions. The determination of the resonance frequency makes it possible to deduce the proportion of $UF_6$ contained in the mixture by referring to the curve of FIG. 2.

This curve, which is given by way of example, has been established in the case of an analyzer having the following dimensions:

radius of the cylindrical communication passageway 4: 4 millimeters,
volume of each conical resonator: 20 cubic centimeters,
cross-sectional area of the cylindrical communication passageway 4: 50 square millimeters,
length of the passageway 4: 2 x 4 millimeters.

In the particular case under consideration, the resonance frequency as measured in respect of high-purity $UF_6$ is 370 c./s. under the following conditions:

temperature: 333° K.,
pressure: 300 mm. Hg.

These figures correspond to a velocity of sound in the vicinity of 90 m./s.

However, the invention is not limited to the particular embodiment which is described above by way of example. Thus, the conical shape of the cavities has been adopted for reasons of ease of mechanical construction. But it also remains possible to make use of hemispehical cavities as shown in the diagram of FIG. 3. Other shapes could also be employed, provided that the surfaces which limit the cavities are as close as possible to surfaces of revolution and that the cross-sectional area of these cavities is of continually increasing magnitude from the communication opening to the electro-acoustic emitter or up to the microphone.

The invention also extends to various possible applications of the sonic analyzer, and especially to the measurement of the velocity of sound in a gas or to the determination of the ratio of specific heat values at constant pressure and at constant volume.

What is claimed is:

1. A sonic analyzer comprising two cavities interconnected by a communication passageway and provided with means for introducing a gas to be analyzed, a variable-frequency wave emitter in acoustic communication with a first of said cavities, and an electro-acoustic receiver in acoustic communication with the second of said cavities, said cavities being symmetrical with respect to said passageway and the cross-sectional area of each cavity being of progressively increasing magnitude from said passageway up to said emitter and said receiver respectively, and the complete assembly of passageway and cavities having a symmetry of revolution with respect to the axis of said passageway.

2. A sonic analyzer in accordance with claim 1 comprising means for circulating said gas continuously through said cavities, said means comprising an inlet and outlet for the admission and discharge of gas, said inlet and outlet being adapted to open into the central zone of said passageway at two diametrically opposite points.

3. A sonic analyzer in accordance with claim 1, wherein said cavities have a conical shape.

References Cited

UNITED STATES PATENTS 2,952,153   9/1960   Robinson _____ 73—24

CHARLES A. RUEHL, *Primary Examiner.*